United States Patent
Yamagishi

(10) Patent No.: US 7,341,522 B2
(45) Date of Patent: Mar. 11, 2008

(54) GAME SYSTEM WITH GAMING MACHINE INTERCONNECTED TO A CELLULAR PHONE

(75) Inventor: Junichi Yamagishi, c/o Unirec Co., Ltd., 6-3, 2-chome, Kaminarimon, Taito-ku, Tokyo (JP) 111-0034

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 588 days.

(21) Appl. No.: 10/394,534

(22) Filed: Mar. 21, 2003

(65) Prior Publication Data

US 2004/0185935 A1     Sep. 23, 2004

(51) Int. Cl.
*A63F 9/24* (2006.01)
(52) U.S. Cl. .................................................... 463/42
(58) Field of Classification Search .................. 463/20, 463/25, 29, 42
See application file for complete search history.

(56) References Cited

U.S. PATENT DOCUMENTS

| | | | |
|---|---|---|---|
| 5,458,333 A | 10/1995 | Takemoto et al. | |
| 5,496,032 A | 3/1996 | Okada | |
| 5,655,961 A | 8/1997 | Acres et al. | |
| 5,759,102 A | 6/1998 | Pease et al. | |
| 5,762,552 A | 6/1998 | Vuong et al. | |
| 5,765,552 A | 6/1998 | Zanen et al. | |
| 5,770,533 A * | 6/1998 | Franchi | 463/42 |
| 5,797,085 A * | 8/1998 | Beuk et al. | 455/88 |
| 5,809,251 A | 9/1998 | May et al. | |
| 5,833,540 A | 11/1998 | Miodunski et al. | |
| 5,836,817 A | 11/1998 | Acres et al. | |
| 5,839,956 A | 11/1998 | Takemoto | |
| 5,854,975 A * | 12/1998 | Fougnies et al. | 455/408 |
| 5,941,774 A | 8/1999 | Takemoto et al. | |
| 5,999,808 A * | 12/1999 | LaDue | 455/412.2 |
| 6,019,283 A | 2/2000 | Lucero | |
| 6,089,982 A | 7/2000 | Holch et al. | |
| 6,263,497 B1 | 7/2001 | Maeda et al. | |
| 6,280,328 B1 | 8/2001 | Holch et al. | |
| 6,315,668 B1 * | 11/2001 | Metke et al. | 463/42 |
| 6,409,602 B1 * | 6/2002 | Wiltshire et al. | 463/42 |

(Continued)

FOREIGN PATENT DOCUMENTS

JP     10-108977     4/1998

(Continued)

*Primary Examiner*—Ronald Laneau
*Assistant Examiner*—Tramar Harper
(74) *Attorney, Agent, or Firm*—Jordan and Hamburg LLP

(57) ABSTRACT

A game system correlates games played on cellular phones with games played on arcade game machines. The game system includes a game machine installed in an amusement arcade, to run a game based on at least points, a floor management unit installed in the amusement arcade, to manage the game machine and be connectable to the Internet, a game content providing unit to provide game content via the Internet, a mobile communication terminal to receive the game content via the Internet and run a game based on the received game content, and a point data management unit to store and update data on points to be won or lost by playing the game on the mobile communication terminal. The floor management unit receives points related to an authenticated person from the point data management unit and enables the game machine for the authenticated person.

2 Claims, 2 Drawing Sheets

U.S. PATENT DOCUMENTS

| | | |
|---|---|---|
| 6,628,934 B2 | 9/2003 | Rosenberg et al. |
| 6,631,840 B1 | 10/2003 | Muramatsy et al. |
| 6,645,075 B1 * | 11/2003 | Gatto et al. .................... 463/25 |
| 6,645,077 B2 | 11/2003 | Rowe |
| 6,682,423 B2 | 1/2004 | Brosnan et al. |
| 6,699,124 B2 * | 3/2004 | Suchocki ..................... 463/42 |
| 6,729,956 B2 | 5/2004 | Wolf et al. |
| 6,739,972 B2 | 5/2004 | Flanagan-Parks et al. |
| 6,846,238 B2 * | 1/2005 | Wells .......................... 463/39 |
| 6,921,333 B2 * | 7/2005 | Taguchi ......................... 463/9 |
| 6,928,278 B2 | 8/2005 | Shimomura |
| 7,025,674 B2 * | 4/2006 | Adams et al. .................. 463/1 |
| 2002/0058550 A1 | 5/2002 | Pace et al. |
| 2002/0071557 A1 | 6/2002 | Nguyen |
| 2002/0123336 A1 | 9/2002 | Kamada |
| 2003/0064771 A1 | 4/2003 | Morrow et al. |
| 2003/0204472 A1 | 10/2003 | Yamagishi |
| 2004/0032086 A1 | 2/2004 | Barragan |
| 2004/0067794 A1 | 4/2004 | Coetzee |
| 2004/0082379 A1 * | 4/2004 | Yamagishi ................... 463/25 |
| 2004/0185935 A1 * | 9/2004 | Yamagishi ................... 463/42 |

FOREIGN PATENT DOCUMENTS

| | | |
|---|---|---|
| JP | 11-164953 | 6/1999 |
| JP | 11-254954 | 9/1999 |
| JP | 2000-321805 | 11/2000 |
| JP | 2001-70630 | 3/2001 |
| JP | 2001-232054 | 8/2001 |
| JP | 2001-246146 | 9/2001 |
| JP | 2001-276403 | 10/2001 |
| JP | 2001-319164 | 11/2001 |
| JP | 2002-35415 | 2/2002 |
| JP | 2002-049419 | 2/2002 |
| JP | 2002-109395 | 4/2002 |
| JP | 2002189829 A * | 7/2002 |
| JP | 2003038811 A * | 2/2003 |
| JP | 2003181099 A * | 7/2003 |
| WO | WO 01/63568 A2 | 8/2001 |

* cited by examiner

GAME SYSTEM WITH GAMING MACHINE INTERCONNECTED TO A CELLULAR PHONE

BACKGROUND OF THE INVENTION

1. Field of the Invention

The present invention relates to a game system that correlates games played on cellular phones with games played on game machines installed in amusement arcades, as well as a game system that correlates game machines played with tokens with the other types of game machines.

2. Description of the Related Art

An example of a game machine installed in an amusement arcade and played with tokens is disclosed in Japanese Patent Laid Open Publication No. 10-108977. To play this sort of game machine, one must visit the amusement arcade where the game machine is installed.

On the other hand, in recent years, one can employ a mobile communication terminal such as a cellular phone to receive game content and play a game on the cellular phone based on the received game content without visiting an amusement arcade.

The cellular phone, however, is very small compared with an arcade game machine, and therefore, may only serve for temporary enjoyment of a game and no replacement for the taste of an arcade game.

Accordingly, a person who plays a game on a cellular phone may want to visit an amusement arcade and play arcade games. In this case, correlating games played on cellular phones with games played on arcade game machines allows cellular-phone-game players to easily play arcade game machines.

Presently, there is no technique to correlate cellular-phone games with arcade games. There is no facility for a person who plays games on a cellular phone to make him or her easily play games on arcade game machines.

There is another problem concerning arcade games. A game machine installed in an amusement arcade and played with tokens (including medals, coins, and the like) reimburses more tokens than inserted tokens if the player wins a game played on the game machine. If the reimbursed tokens are usable for other types of game machines that are not based on tokens installed in the amusement arcade, it will be convenient for the player. There is, however, no compatibility between the token-based game machines and the non-token-based game machines, to force inconvenience to players.

SUMMARY OF THE INVENTION

A first object of the present invention is to provide a game system that correlates games played on mobile communication terminals such as cellular phones with games played on arcade game machines. A second object of the present invention is to provide a game system that realizes compatibility between token-based game machines and the other game machines.

In order to accomplish the objects, a first aspect of the present invention provides a game system including a game machine installed in an amusement arcade, to run a game based on at least points, a floor management unit installed in the amusement arcade, to manage the game machine and be connectable to the Internet, a game content providing unit to provide game content via the Internet, a mobile communication terminal to receive the game content via the Internet and run a game based on the received game content, and a point data management unit to store and update data on points to be won or lost by playing the game on the mobile communication terminal. The floor management unit receives points related to an authenticated person from the point data management unit and enables the game machine for the authenticated person.

For the game system of the first aspect, a second aspect of the present invention provides a feature that the authentication of a person is based on data input to the game machine through the mobile communication terminal.

For the game system of any one of the first and second aspects, a third aspect of the present invention provides features that the point data management unit is a master management unit to store application software for managing operation of the game machine and that the floor management unit downloads an appropriate piece of the application software from the master management unit via the Internet, and according to the downloaded application software, manages operation of the game machine as and when required.

For the game system of any one of the first to third aspects, a fourth aspect of the present invention provides a feature that points are purchasable with the mobile communication terminal and an accounting server is provided to charge for the purchased points.

A fifth aspect of the present invention provides a game system that allows, in an amusement arcade, a player to borrow tokens, play token-based game machines with the borrowed tokens, deposit tokens left after playing the token-based game machines, receive the deposited tokens, and play the token-based game machines with the received tokens. The game system includes a floor management unit installed in the amusement arcade, to manage game machines installed in the amusement arcade and be connectable to the Internet, and a point data management unit to store and update data on points related to tokens deposited by players. The floor management unit receives points related to an authenticated person from the point data management unit and enables a game machine for the authenticated person.

According to the first aspect, a player may play a game on a game machine, which is installed in an amusement arcade, based on at least points. The game machine is managed by the floor management unit. The player may employ a mobile communication terminal to receive game content from the game content providing unit via the Internet and play a game on the mobile communication terminal based on the received game content. If the player wins or loses points by playing the game on the mobile communication terminal, the won or lost points are stored or updated in the point data management unit.

The floor management unit receives points related to an authenticated person from the point data management unit and enables the game machine for the authenticated person. Any person is allowed to play a game on a mobile communication terminal to win points, and with the use of the won points, enjoy an arcade game by visiting an amusement arcade.

In addition to the effects of the first aspect, the second aspect authenticates a player based on data input to a game machine through a mobile communication terminal. The player can easily input the authentication data, and authentication is surely carried out.

In addition to the effects of the first and second aspects, the third aspect employs, as the point data management unit, the master management unit to store application software for managing operation of the game machine. The floor management unit downloads an appropriate piece of the application software from the master management unit via the Internet, and according to the downloaded application software, manages operation of game machines as and when required. The floor management unit uses the downloaded application software to correctly manage game machines with, for example, a wireless POS (point of sale) system. This realizes a nationwide development of amusement facilities with game machines at low cost, as well as proper management of game machines at any time.

Whenever new know-how is introduced into the application software, the amusement arcade can quickly download it via the Internet and use the same to optimize management. To introduce new know-how into the application software, a provider of the application software can pick up improvements from the facilities spread nationwide. Accordingly, each amusement arcade is not required to improve the application software by itself. Instead, the amusement arcade is property manageable by downloading the optimized application software.

If the wireless POS system is employed for managing the amusement arcade, sales information of the amusement arcade can be grasped in real time even just after rearrangement or replacement of game machines in the amusement arcade.

In addition to the effects of the first to third aspects, the fourth aspect enables a player to purchase points with a mobile communication terminal. The accounting server charges the player for the purchased points. The player may receive game content on the mobile communication terminal and plays a game based on the received game content. If the player loses points by playing the game, the player can purchase points with the mobile communication terminal. The player is allowed to use the points for playing arcade game machines. Namely, the player can easily play games in an amusement arcade without carrying coins such as 100-yen coins.

According to the fifth aspect, the game system allows, in an amusement arcade, a player to borrow tokens, play token-based game machines with the borrowed tokens, deposit tokens left after playing the token-based game machines, receive the deposited tokens, and play the token-based game machines with the received tokens. The game system includes a floor management unit installed in the amusement arcade, to manage game machines installed in the amusement arcade and be connectable to the Internet and a point data management unit to store and update data on points related to tokens deposited by players. The floor management unit receives points related to an authenticated person from the point data management unit and enables a game machine for the authenticated person.

When a player plays a token-based game machine, the player may win or lose tokens. Points corresponding to the won or lost tokens are stored in the master management unit, so that the player may play game machines other than the token-based game machines according to the stored points.

DETAILED DESCRIPTION OF EMBODIMENTS

Figure 1:
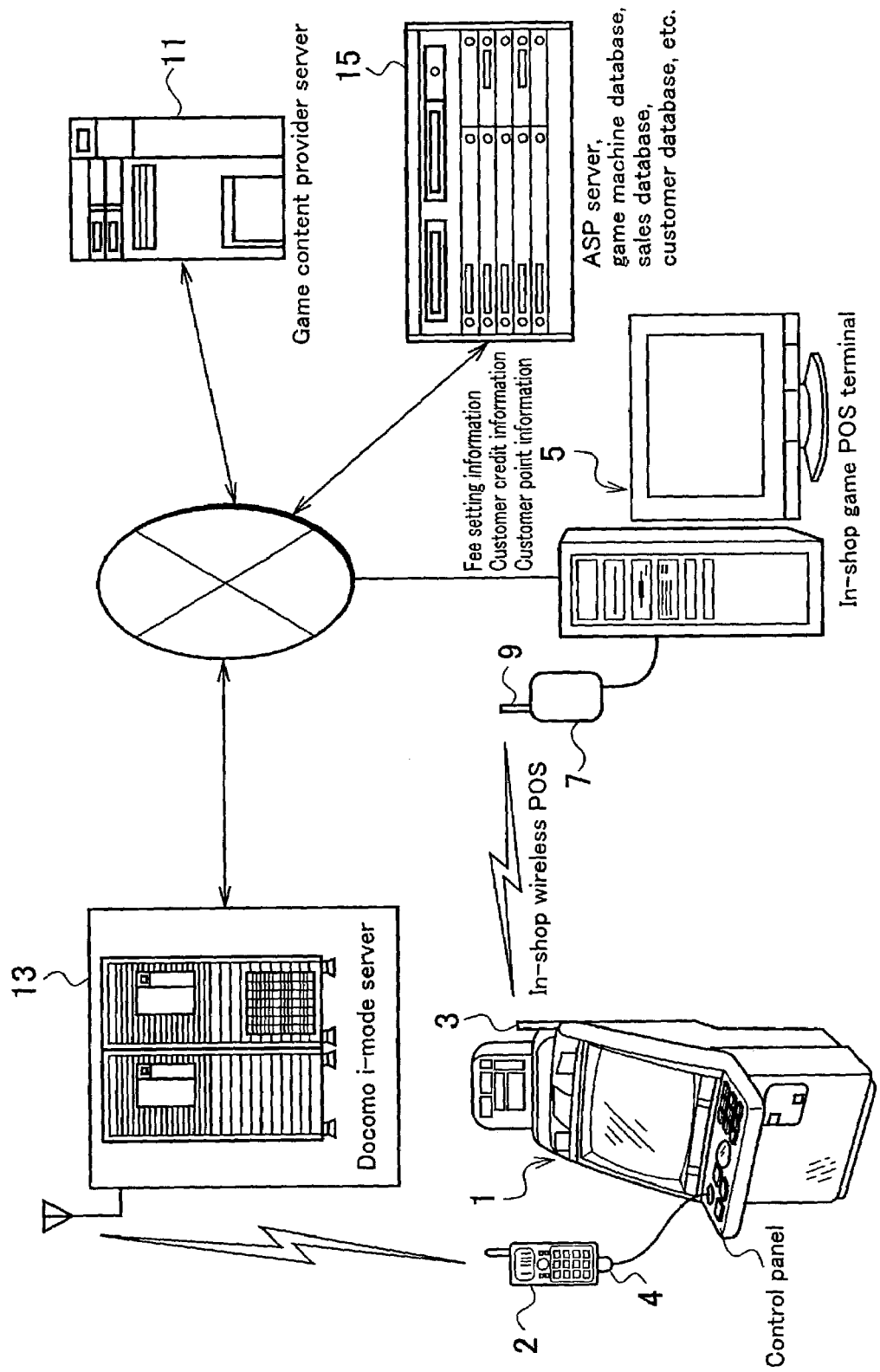
FIG. 1 is a block diagram showing a game system according to a first embodiment of the present invention.

FIG. 1 is a block diagram showing a game system according to the first embodiment of the present invention.

The game system includes a game machine 1 installed in an amusement arcade. The game machine 1 is playable according to at least points. According to the first embodiment, the game machine 1 is also playable with tokens, medals, or coins such as 100-yen coins inserted into the game machine 1. Although FIG. 1 shows only one game machine 1, various types of game machines are installed on each floor in an actual amusement arcade.

The game machine 1 has an antenna 3 to wirelessly transmit and receive data. The game machine 1 also has a connection terminal 4 to be connected to a mobile communication terminal such as a cellular phone 2.

The game system also includes a floor management unit 5 installed in the amusement arcade. The floor management unit 5 functions as an in-shop game POS terminal and may be a personal computer. The floor management unit 5 has a wireless unit 7 to transmit and receive data through an antenna 9. The floor management unit 5 is connectable to the Internet.

The game system also includes a game content provider server 11 acting as a game content providing unit to provide game content via the Internet. The server 11 may be managed by a person who is identical to or different from a person who owns or manages the amusement arcade. The game content provided by the server 11 is not particularly limited and is optional. The game content provided by the server 11 can be received by the cellular phone 2 so that one may play a game on the cellular phone 2 according to the received game content. In FIG. 1, the cellular phone 2 is connected to the game machine 1. To receive game content from the server 11 and play a game on the cellular phone 2, the cellular phone 2 is disconnected from the game machine 1.

The cellular phone 2 is connectable to the Internet through a communication company server, for example, a Docomo i-mode server 13. A player receives, on the cellular phone 2, game content from the game content provider server 11, plays a game accordingly, and as a result, wins or loses points. Data related to the won or lost points is stored or updated in a master management unit 15 serving as a point data management unit.

According to the first embodiment, the master management unit 15 stores plural pieces of application software including know-how to manage the game machine 1. The application software is, for example, to form a POS (point of sale) system to grasp, in real time, sales information of amusement arcades deployed nationwide. According to the embodiment, the POS system is a wireless POS system.

The floor management unit 5 manages operation of the game machine 1 according to application software downloaded from the master management unit 15 via the Internet. In this case, the master management unit 15 serves as an application software service provider (ASP).

Application software pieces stored in the master management unit 15 include those to maintain the game machine 1, manage the sales of the game machine 1, control work hours of the staff, etc. The application software contains high-level know-how in connection with management.

The master management unit 15 includes a database that keeps many information pieces including, in connection with the game machine 1, a machine name (frame name), a game name (board name), the number of slots, a type, set fees (50 yen, 100 yen, and the like), a purchased date, a price, depreciation, dimensions, weight, parts replacement history, repair history, shop information, sales information, and the like.

In the amusement arcade, a player plays the game machine 1. Usually, the game machine 1 is started when a token, which may be a coin, a medal, or any other, is inserted therein. The number of tokens inserted into the game machine 1 is counted and is used to manage and grasp the operation of the game machine 1 at any time. For example, at every specific time such as every 00 minutes on every hour programmed in the game machine 1, or in response to a command signal (a radio signal indicating an ID number of the game machine 1) from the floor management unit 5, the game machine 1 transmits the machine number of the game machine 1 and count data to the floor management unit 5 through the antenna 3. The floor management unit 5 receives the transmitted data.

In this way, the floor management unit 5 receives data from all game machines controlled by the floor management unit 5 and sorts and summarizes the received data. At this time, a staff member connects the floor management unit 5 to the Internet, downloads necessary application software from the master management unit 15 via the Internet, and retrieves necessary data from a POS database, to thereby manage the game machines. For example, the staff member downloads accounting software from the master management unit 15, retrieves machine names, game names, set fees, set points, etc., from the POS database, prints out the sales report.

On the other hand, a player may manipulate the cellular phone 2 outside the amusement arcade away from the game machine 1, to receive game content from the game content provider server 11 via the communication company server 13 and the Internet. The player then plays a game on the cellular phone 2 alone. If the player wins the game on the cellular phone 2, the player may get points. Data related to the point won or lost by the player is stored and updated in the master management unit 15. In this way, the cellular phone 2 is used to receive game content and win or lose points on a game played according to the received game content.

The player with the cellular phone 2 may visit the amusement arcade and play the game machine 1. At this time, the player connects the cellular phone 2 to the connection terminal 4 of the game machine 1, and the player is allowed to play the game machine 1 with the player's points stored in the master management unit 15. More precisely, the player manipulates the cellular phone 2 to enter an ID code and a password concerning the player and authenticate the player with respect to the master management unit 15. At this time, the ID code and password are transferred through the antenna 3 of the game machine 1, the antenna 9 of the floor management unit 5, the wireless unit 7 of the floor management unit 5, and the Internet to the master management unit 15.

If the player is authenticated according to the entered data, the floor management unit 5 downloads the points of the player from the master management unit 15. If the points are within the set fee or points of the game machine 1, the floor management unit 5 enables the game machine 1 for the player. In this way, the player can play the game machine 1 according to points obtained with the cellular phone 2.

The embodiment thus correlates a game played on the cellular phone 2 with a game played on the game machine 1 installed in the amusement arcade. A player can enjoy the game machine 1 in the amusement arcade according to a result of a game played on the cellular phone 2. This greatly expands the degree of freedom of games played on the cellular phone 2 and those played on game machines in amusement arcades.

According to the embodiment, application software including high-level know-how is downloadable from the master management unit 15, and according to the downloaded application software, the game machine 1 and the like can be operated and managed. When expanding amusement arcades nationwide, a managing company thereof is required to develop no application software but the company can use the application software by downloading it from the master management unit 15. As a result, the managing company can expand amusement arcades at low cost.

For the amusement-arcade managing company, developing a nationwide POS system requires an initial investment of several hundreds of millions yen. According to the embodiment, an initial investment of constructing a wireless LAN system is sufficient. In addition, to utilize the application software with high-level know-how stored in the master management unit 15, the managing company is required to pay, for example, a commission of about 3% of sales. Namely, on the one hand, the software provider provides application-specific software including business know-how and charges a know-how fee or a software fee for the software, and on the other, the amusement-arcade managing company speedily receives the business know-how to optimize amusement-arcade management and improve sales.

When introducing new know-how into the application software, the software provider having accumulated know-how may pick up improvements from facilities deployed nationwide. The amusement-arcade managing company is not required to improve the application software by itself and can always optimize amusement-arcade management by downloading the proper application software.

Amusement arcades frequently introduce new machines or replace old machines with new ones. A large amusement arcade has 200 to 300 game machines. The wireless POS system mentioned above is advantageous in smoothly managing and operating many game machines that are frequently rearranged or replaced.

When the cellular phone 2 is connected to the game machine 1 to play a game, or when the cellular phone 2 alone is operated to play a game, the player may lose points. In this case, the player may purchase points through the cellular phone 2. For this purpose, an accounting server is arranged to charge the player for the purchased points. The charge for the purchased points may be collected by the communication company 13, who deducts call fees and a commission from the collected charge and pays the remnant to the amusement arcade.

When the game content provider server 11 provides the player having the cellular phone 2 with game content, the accounting server charges the player for a game content fee. The fee may be collected by the communication company 13, who deducts call fees and a commission from the collected fee and pays the remnant to the game content provider 11.

Figure 2:
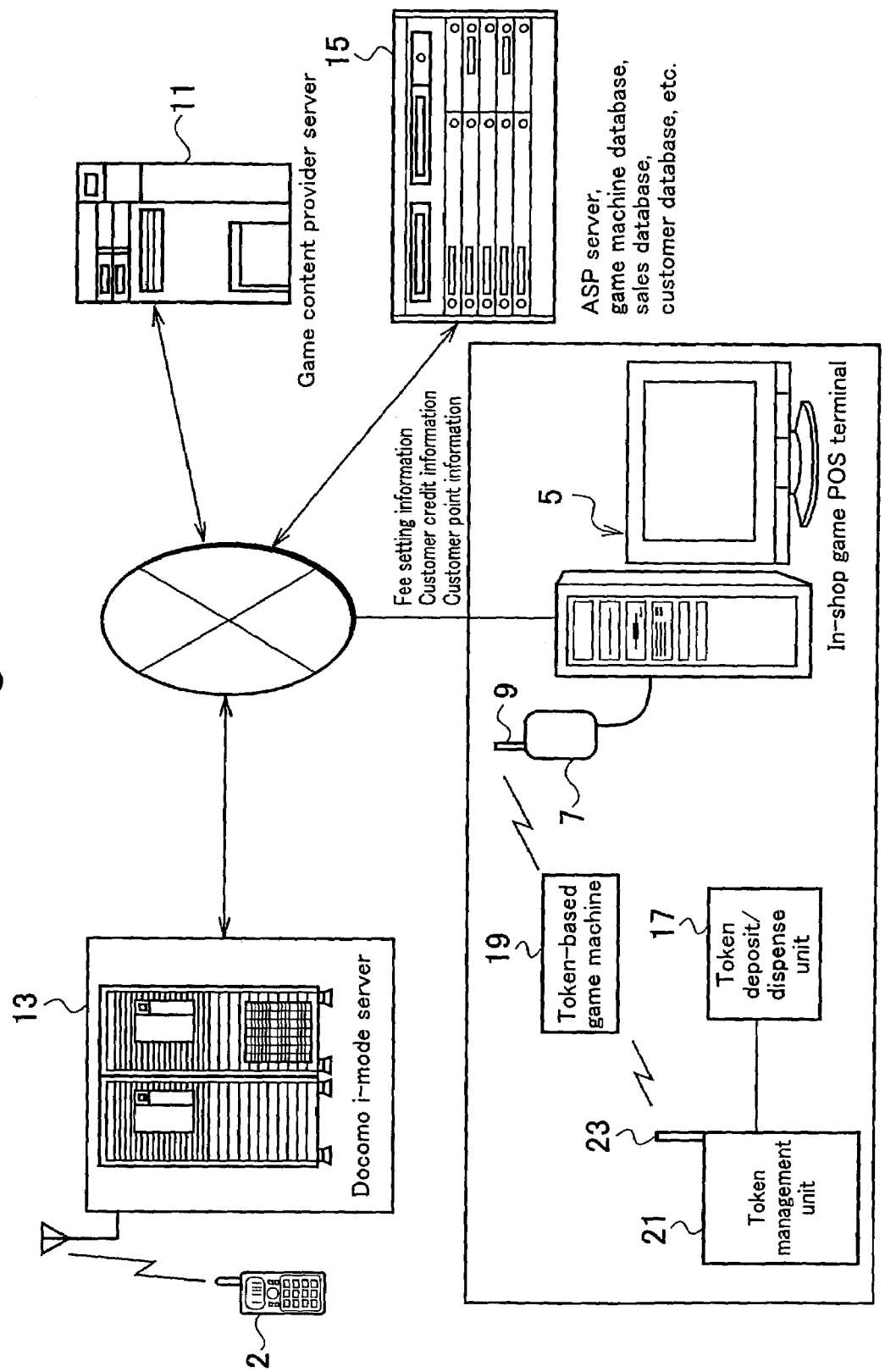
FIG. 2 is a block diagram showing a game system according to a second embodiment of the present invention.

FIG. 2 is a block diagram showing a game system according to the second embodiment of the present invention. According to the second embodiment, a token management system is wirelessly connected to a floor management unit 5 installed in an amusement arcade. Also installed in the amusement arcade is a token deposit/dispense unit 17. The deposit/dispense unit 17 lends tokens or medals to a player in return for an amount of money inserted into the deposit/dispense unit 17.

The player uses the lent tokens to play a token-based game machine 19, and if some tokens remain, the player can deposit the remaining tokens in the deposit/dispense unit 17.

To deposit tokens in the deposit/dispense unit 17 or to receive deposited tokens from the same, one must authenticate himself or herself through a fingerprint or a password.

The deposited tokens in the deposit/dispense unit 17 are returned to the player whenever the player wants the same. The player can use the returned tokens to play the token-based game machine 19. The deposit/dispense unit 17 is connected to a token management unit 21 installed in the amusement arcade. The token management unit 21 is controlled by a manager or an owner of the amusement arcade.

The management unit 21 has an MPU, a memory, and the like. The management unit 21 also has an antenna 23 to wirelessly transmit and receive data to and from the floor management unit 5. Alternatively, the management unit 21 is connectable to the floor management unit 5 through wires. Information concerning the deposited tokens is transferred from the deposit/dispense unit 17 to the management unit 21. The information is then passed through the floor management unit 5 and is stored or updated in a master management unit 15. At this time, not only the information related to the number of the tokens but also information related to points corresponding to the tokens is stored or updated in the master management unit 15.

When a player plays the token-based game machine 19 with tokens, information about points corresponding to tokens won or lost by the player is stored in the master management unit 15. According to the stored points, the player can play game machines other than the token-based game machine 19. After playing the game machines other than the token-based game machine 19, the points of the player decrease. If the player wants to receive tokens from the deposit/dispense unit 17, the player can receives tokens according to the decreased points.

A player having a cellular phone 2 can play a token-based game on the cellular phone 2. In this case, the player wins or loses tokens on the cellular phone 2. The won or lost tokens and points corresponding to the tokens are stored or updated in the master management unit 15, so that the player may play arcade game machines according to the points stored in the master management unit 15.

In this way, the second embodiment realizes compatibility between token-based game machines and non-token-based game machines and greatly expands the degree of usability of tokens and corresponding points.

What is claimed is:

1. A game system comprising:
   a game content providing unit configured to provide, via an Internet connection, game content data enabling a game to be played on a cellular phone in which points are won and loss;
   a cellular phone configured to receive said game content data via a connection including an Internet connection, storing said game content data, and executing said game content data to perform operation of said game permitting a user to play said game;
   a master management unit connected to the internet and having a point of sales database, said master management unit being configured as an application service provider storing and transferring via the internet point of sales application software for enabling operation of a device as a point of sales system using said point of sales database and a management system of game machines, and said master management unit storing and updating an amount of said points for cellular phone games won and lost in said game played and executed on said cellular phone, said points being stored associated with said user;
   a game machine installed in an amusement arcade and running a stored game stored thereon based on at least said points stored in said master management unit and won and lost in said game played on said cellular phone;
   said cellular phone being configured to interconnect with said game machine;
   said game machine being configured to interconnect with said cellular phone and read in authentication data of said user from said cellular phone via the interconnection;
   a floor management unit installed in the amusement arcade connected to the game machine via a local area network, connected to the Internet, and connected to the master management unit; and
   the floor management unit having said point of sales application software downloaded via an internet connection thereon from said master management unit and being configured by said point of sales application software to serve as a point of sales terminal, to receive points data of said points, stored in association with said user, from said point data management unit in response to authentication of said authentication data received by said game machine, and to manage the game machine in real time including enabling the game machine for operation by said user based on receipt of said points data, wherein
   the cellular phone is configured such that the authentication data is input through the cellular phone interconnected with the game machine and is transferred from the game machine to the master management unit through the floor management unit relaying between the game machine with which the cellular phone is interconnected and the master management unit, and
   the floor management unit is configured to download the points of an authenticated user from the master management unit on the basis of the authentication of the authentication data provided by the user and in response thereto place the game machine into an enabled gaming state.

2. The game system of claim 1, wherein:
points are purchasable with the cellular phone; and
an accounting server is provided to charge for the purchased points.

* * * * *